(12) United States Patent
Yamaguchi (10) Patent No.: US 7,177,914 B1
(45) Date of Patent: Feb. 13, 2007

(54) SYSTEM OF DYNAMIC MODULE CONFIGURATION AND A METHOD THEREOF

(75) Inventor: Tomohisa Yamaguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/337,500

(22) Filed: Jun. 22, 1999

(30) Foreign Application Priority Data

Nov. 10, 1998 (JP) .................................. 10-318602

(51) Int. Cl.
*G06F 15/16* (2006.01)

(52) U.S. Cl. ...................... 709/217; 709/203; 709/213; 709/218; 709/219; 707/10

(58) Field of Classification Search ................ 709/203, 709/223, 227, 213–215, 216, 246, 229, 217–219; 707/10; 711/114; 345/619; 714/4, 15
See application file for complete search history.

(56) References Cited

U.S. PATENT DOCUMENTS

| | | | | |
|---|---|---|---|---|
| 5,815,718 A | * | 9/1998 | Tock ........................... | 395/705 |
| 5,838,910 A | * | 11/1998 | Domenikos et al. ........ | 709/203 |
| 5,889,944 A | * | 3/1999 | Butt et al. .................. | 709/203 |
| 5,978,846 A | * | 11/1999 | Kimishima ................. | 709/227 |
| 6,003,085 A | * | 12/1999 | Ratner et al. ............... | 709/203 |
| 6,157,924 A | * | 12/2000 | Austin ......................... | 707/10 |
| 6,161,147 A | * | 12/2000 | Snyder et al. .............. | 709/310 |
| 6,237,024 B1 | * | 5/2001 | Wollrath et al. ............. | 709/203 |
| 6,237,031 B1 | * | 5/2001 | Knauerhase et al. ........ | 709/203 |
| 6,240,442 B1 | * | 5/2001 | Domenikos et al. ........ | 709/203 |
| 6,243,738 B1 | * | 6/2001 | Hayles et al. ............... | 709/203 |
| 6,247,050 B1 | * | 6/2001 | Tso et al. .................... | 709/224 |
| 6,260,069 B1 | * | 7/2001 | Anglin ........................ | 709/229 |
| 6,279,030 B1 | * | 8/2001 | Britton et al. .............. | 709/203 |
| 6,289,376 B1 | * | 9/2001 | Taylor et al. ............... | 709/203 |
| 6,289,506 B1 | * | 9/2001 | Kwong et al. .............. | 717/9 |
| 6,317,743 B1 | * | 11/2001 | Heck ........................... | 707/10 |
| 6,317,795 B1 | * | 11/2001 | Malkin et al. .............. | 345/619 |
| 6,330,689 B1 | * | 12/2001 | Jin et al. ...................... | 714/15 |
| 6,360,330 B1 | * | 3/2002 | Mutalik et al. ............. | 714/4 |

FOREIGN PATENT DOCUMENTS

| EP | 1 072 973 A2 | * | 1/2001 |
|---|---|---|---|
| JP | 2004/151849 A | * | 5/2004 |

OTHER PUBLICATIONS

"Java Programming", Editing by Japan Sun Micro Systems Published by Science Co. and English translation (1 page).
"OS will be unnecessary because of JAVA", M. Ikeda, Japan 1996 and English translation (10 pages).

* cited by examiner

*Primary Examiner*—ThuHa Nguyen
(74) *Attorney, Agent, or Firm*—Birch, Stewart, Kolasch & Birch, LLP (57) ABSTRACT

A client, a server and a module storing server are linked to a network. When the client outputs a request, the server acquires one of function executing modules, which has a function corresponding to the request from the client, in the module storing server. The acquired function executing module is executed, and then deleted from the server after the execution has been completed.

16 Claims, 12 Drawing Sheets

SYSTEM OF DYNAMIC MODULE CONFIGURATION AND A METHOD THEREOF

BACKGROUND OF THE INVENTION

1. Field of the Invention

This invention relates to a system wherein a client and a server are linked to a network. Particularly, it is effective to apply the present invention to a system wherein a resource such as a memory is very limited because the server of the system is included in a device of electric products or office facilities. Moreover, the present invention relates to a system for dynamically composing a module at a client-server system wherein the server responds to the client request by making a response using the module in the server.

2. Description of the Related Art

Figure 12:
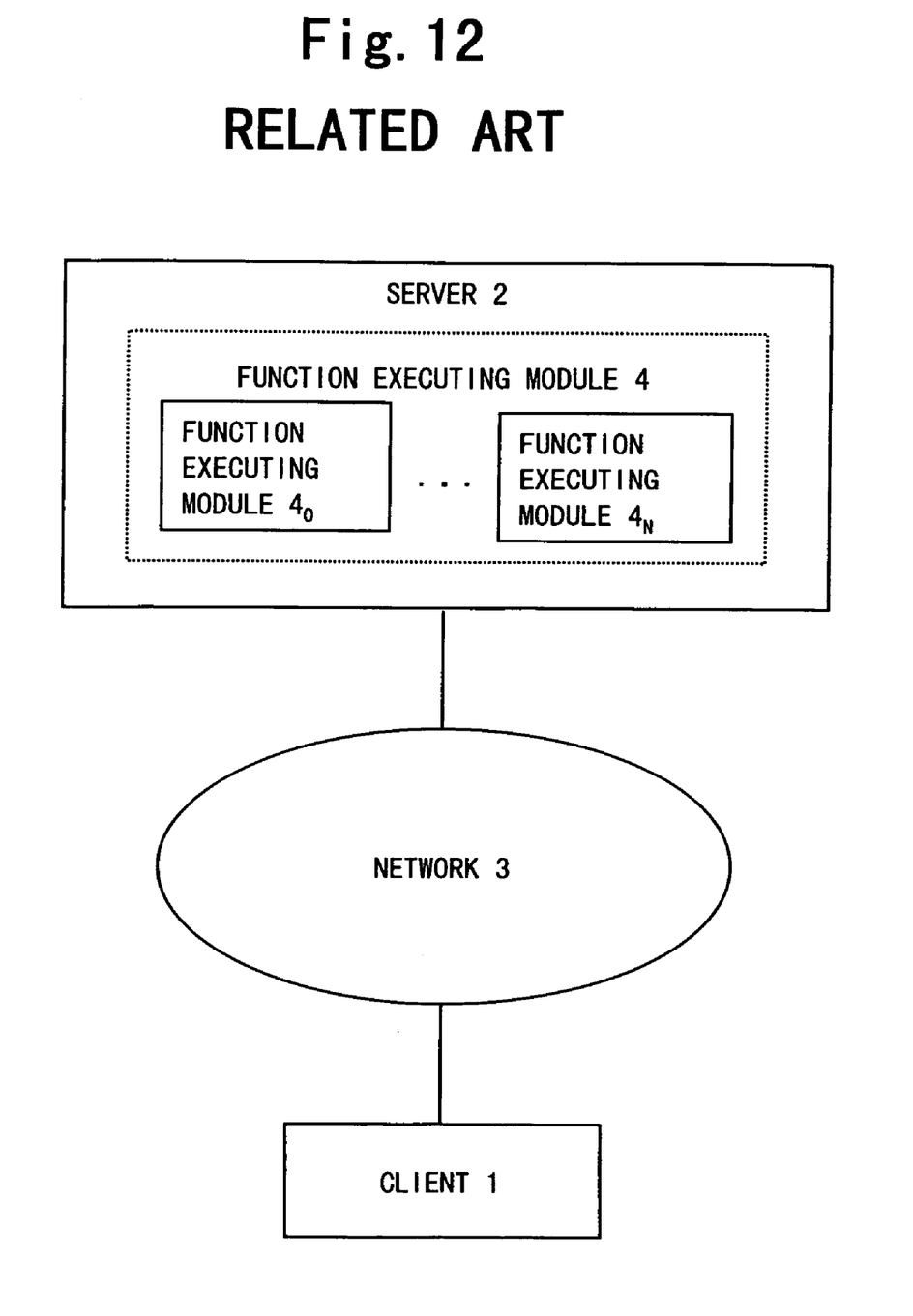
FIG. 12 shows a conventional client server system configuration.

FIG. 12 shows a configuration of a conventional client-server system. A client 1 making a request, a server 2 responding to the client request, a network 3 to which the client 1 and the server 2 are linked, and plural function executing modules 4 each of which makes a response to each request coming from the client 1, are shown in FIG. 12. Contents and services which the client 1 can request are statically specified based on the kinds and the number of the function executing modules stored in the server 2.

The system as shown in FIG. 12 has a problem that the kinds and the number of the function executing modules 4 which make responses to requests coming from the client 1, are restricted based on the resource limit, such as a memory amount, of the server 2. Namely, contents and services which the server 2 can provide to the client 1 are statically specified in advance, depending upon the function executing modules 4 stored in the server 2. Therefore, it is impossible to provide other contents and services except the above.

SUMMARY OF THE INVENTION

The present invention is contrived to solve the above-stated problem. It is an object of the present invention to provide a system in which various contents and services can be supplied to the client, by dynamically acquiring a function executing module corresponding to each request of the client and by making the server have only a basic module for acquiring the function executing module, even when the server resource is limited or the server is included in a device whose resource such as a memory is very limited.

According to one aspect of the present invention, a dynamic module configuration system, linked through a network, comprises a memory, linked to the network, for memorizing a plurality of function executing modules which execute specific processes, a request device which outputs an execution request for executing one of the specific processes to the network, and an execution device for receiving the execution request output from the request device through the network, acquiring one of the plurality of function executing modules which has a function of realizing the execution request from the memory through the network, and executing an acquired function execution module.

According to another aspect of the present invention, a dynamic module configuration method, using a network, comprises the steps of memorizing a plurality of function executing modules for executing specific processes, outputting an execution request for executing one of the specific processes to the network, and receiving the execution request through the network, acquiring one of the plurality of function executing modules which has a function of realizing the execution request through the network, and executing an acquired function execution module.

According to another aspect of the present invention, a dynamic module configuration system comprises an internal resource of a device for performing an original function of the device, and an execution device for receiving an access request which requests information in the device, acquiring one of a plurality of function execution modules, from an external resource, which has a function of realizing the access request, and executing an acquired function execution module, wherein the receiving, acquiring and executing are performed by using a part of the internal resource.

The above and other objects, features, and advantages of the invention will be more apparent from the following description when taken in connection with the accompanying drawings.

DETAILED DESCRIPTION OF THE PREFERRED EMBODIMENTS

Embodiment 1

Figure 1:
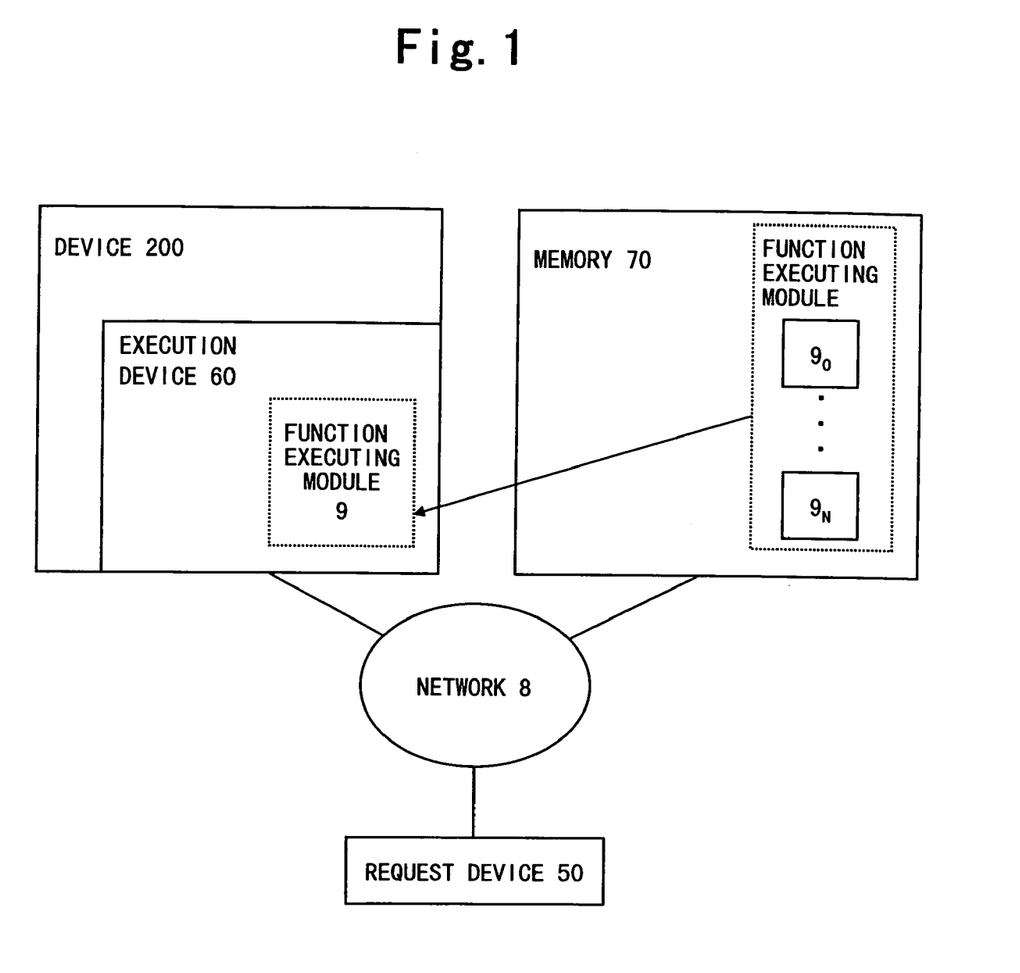
FIG. 1 shows a system configuration according to Embodiment 1 of the present invention.

FIG. 1 shows a system configuration of Embodiment 1. The followings are shown in FIG. 1: a network 8, a plurality of function executing modules $9_0 \ldots 9_N$ for executing specific processes, a memory 70 linked to the network 8 for memorizing the function executing modules $9_0 \ldots 9_N$, a request device 50 for outputting a request for executing a specific process to the network 8, an execution device 60 for receiving the execution request output from the request device 50 through the network 8, acquiring one of the function executing modules $9_0 \ldots 9_N$ from the memory 70 through the network 8 and executing the acquired function execution module 9, and a device 200 including the execution device 60.

As a concrete example of the device 200, anything such as the followings can be the device 200: printer, facsimile, disk drive, personal computer, telephone, television, radio, air conditioner, refrigerator, automobile, airplane, train, machine tool, elevator, escalator, monitoring camera, etc. Namely, anything which is accessed from the outside to acquire the status or information of the thing can be the device 200. Generally, the device 200 includes internal resources in order to perform the device original function. For instance, the internal resources mean hardware (not shown) of the device and a controller (not shown) of the hardware.

The controller usually has a central processing unit (CPU) and a memory. Each part hardware in the device is controlled by executing a program, which is stored in the memory, at the CPU to perform the device original function. In order to keep the cost of the device 200 low, the least amount of hardware necessary for performing the device original function, the CPU having the least processing capacity necessary for performing the device original function, and the memory having the least amount necessary for performing the device original function are usually installed in the device 200. Especially, in producing household electric appliances or office automation appliances which are mass-produced, it is tried to have the least amount of useless part so as to lower the cost. Namely, the mass-produced device usually has the least amount of internal resource necessary for performing the device original function.

According to the present embodiment, the execution device 60 having a server function can be installed in the device 200 even when the device 200 does not have enough internal resources. The server function of the execution device 60 installed in the device can be thoroughly operated.

According to the system of the present Embodiment, in order to lessen the internal resources necessary for installing the execution device 60 and executing the server function, one of the function executing modules $9_0 \ldots 9_N$ is acquired as a function executing module 9 from the memory 70 for executing the request coming from the request device 50. Then, the acquired function executing module 9 is executed in the execution device 60, and the execution result is transmitted to the request device 50. In the present system, the function executing module 9 is not stationed at the execution device 60 but stationed at the memory 70. The memory 70 is an external resource being independent of the device 200. Only a module for acquiring one function executing module 9 from the memory 70 and executing the acquired function executing module 9 is installed in the execution device 60. At every request coming from the request device 50, one function executing module 9 corresponding to the request is acquired and is put into the execution device 60. Because of this configuration, the size of the internal resource used for the execution device 60 in the device 200 can be small. Accordingly, it is possible to install the execution device 60 in the device 200 having limited internal resources, such as a household electric appliance, and to execute a requested function executing module 9 by using the limited internal resources in the device 200.

Figure 2:
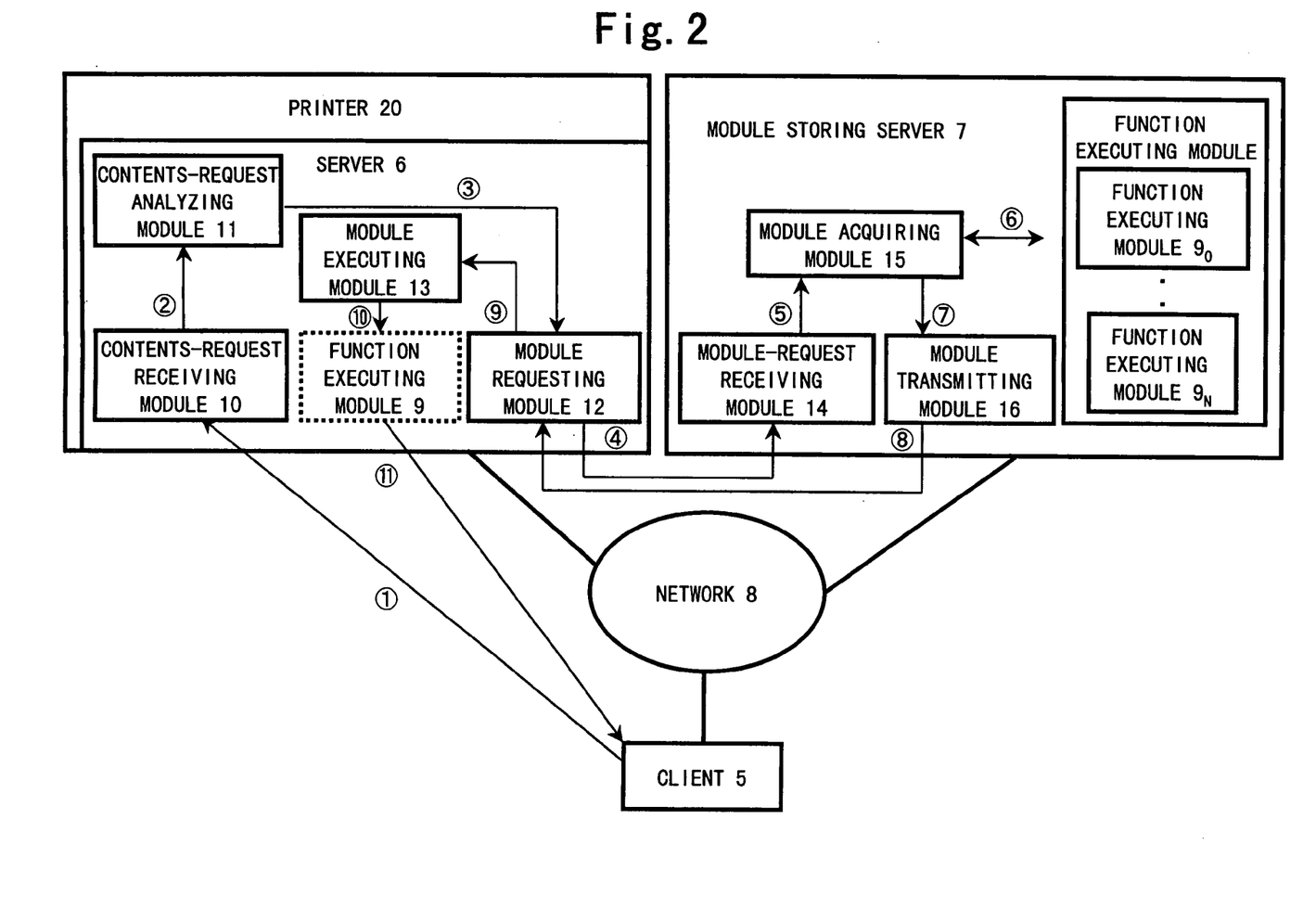
FIG. 2 shows a concrete system configuration of FIG. 1.

FIG. 2 shows a concrete configuration system of FIG. 1. The followings are shown in FIG. 2: a client 5 (an example of the request device 50) which requests contents, a server 6 (an example of the execution device 60) for sending the requested contents to the client 5, a module storing server 7 (an example of the memory 70) for storing modules which have functions necessary for the server 6 so as to send the requested contents to the client 5, a printer 20 (an example of the device 200) including the server 6, the network 8 to which the client 5, the server 6 and the module storing server 7 are linked, the function executing modules $9_0 \ldots 9_N$ which are stored in the module storing server 7 and have functions needed when the server 6 sends the contents to the client 5, a contents-request receiving module 10 for receiving the contents-request from the client 5, a contents-request analyzing module 11 for analyzing the contents-request received by the contents-request receiving module 10 in order to select one of the function executing modules $9_0 \ldots 9_N$ which has a function needed in sending the content to the client 5, a module requesting module 12 for requesting the selected function executing module 9 from the module storing server 7 and receiving the requested function executing module 9 from the module storing server 7, a module executing module 13 for executing the function executing module 9 received by the module requesting module 12, a module-request receiving module 14 for receiving the module-request from the module requesting module 12, a module acquiring module 15 for acquiring a requested function executing module 9 out of the function executing modules $9_0 \ldots 9_N$ based on the module request received by the module-request receiving module 14, and a module transmitting module 16 for transmitting one of the function executing modules $9_0 \ldots 9_N$ acquired by the module acquiring module 15 to the server 6.

Detailed explanation for the processes of the client 5, the server 6 and the module storing server 7 will be described with reference to the flowcharts of FIGS. 3, 4 and 5, and the arrows between modules in FIG. 2.

Figure 3:
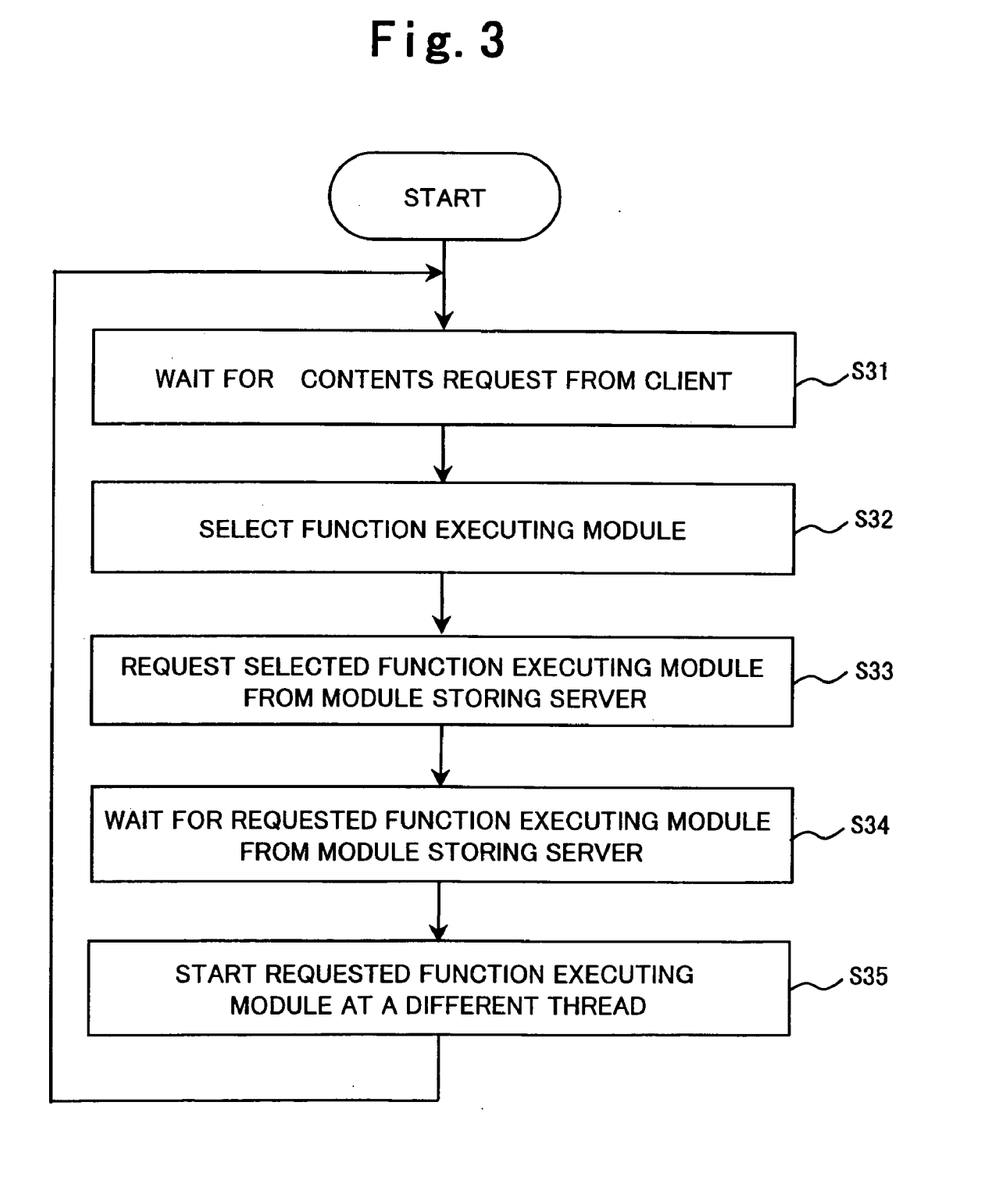
FIG. 3 is a flowchart showing processes performed in a server.
Figure 4:
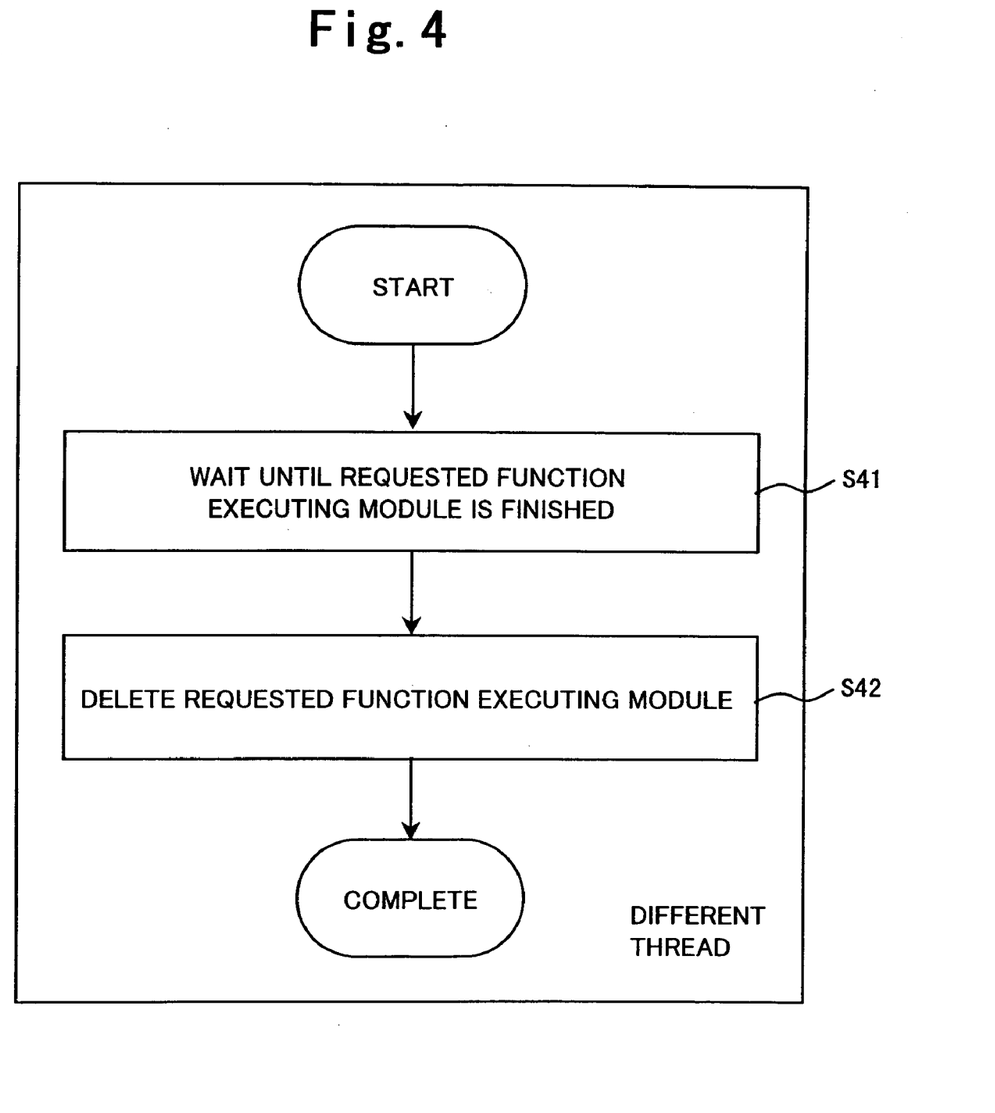
FIG. 4 is a flowchart showing processes performed in the server.
Figure 5:
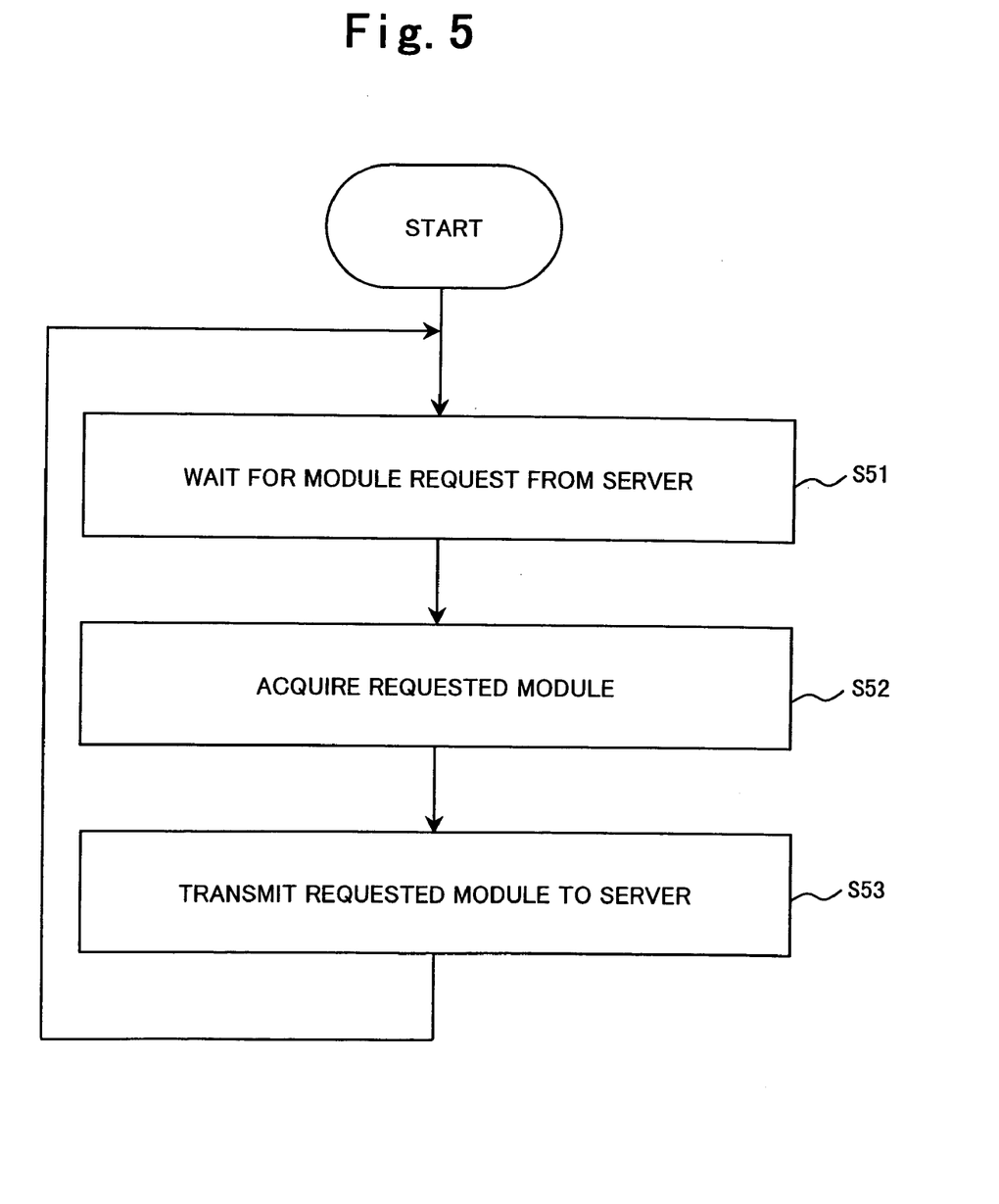
FIG. 5 is a flowchart showing processes performed in a module storing server.

FIGS. 3 and 4 show the processes performed at the server 6 and FIG. 5 shows those at the module storing server 7.

The server in the present embodiment is different from a server in the general client-server system. The server of the present embodiment does not mean the one having independent hardware and independent software prepared in advance, but means the one later installed in a device having a specific original function.

Namely, the sever of the present embodiment can be realized by borrowing and using the device internal resources provided in order to accomplish the specific original function. For instance, the server 6 is realized as a program stored in the controller memory (not shown) of the printer 20. Then, when the program is executed by the controller CPU, the processes of the server 6 shown in FIGS. 3 and 4 can be executed. In the case of the client 5 inquiring the status of the printer 20, for example, being printed or not, or inquiring the print waiting status, the server 6 installed in the printer 20 starts the following processes:

First, the contents-request receiving module 10 in the server 6 is waiting for a contents-request coming from the client 5. (S31) The client 5 requests contents from the sever 6. (arrow ①) The contents-request receiving module 10 receives the contents-request from the client 5 and sends the contents-request to the contents-request analyzing module 11. (arrow ②)

Then, the contents-request analyzing module 11 analyzes the received contents-request in order to select one of the function executing modules $9_0 \ldots 9_N$ which has a necessary function for sending contents to the client 5, and informs the module requesting module 12 of the selected function executing module 9. (S32) (arrow ③)

The module requesting module 12 requests the selected function executing module 9 from the module storing server 7. (S33) (arrow ④)

In the meantime, the module-request receiving module 14 in the module storing server 7 is waiting for the module request from the server 6. (S51) After receiving the module request from the server 6, the module-request receiving module 14 sends it to the module acquiring module 15. (arrow ⑤)

Then, receiving the module request, the module acquiring module 15 acquires the requested function executing module 9 based on the module request (S52) (arrow ⑥) and sends the acquired module to the module transmitting module 16. (arrow ⑦)

The module transmitting module 16 transmits the received function executing module 9 to the sever 6. (S53) (arrow ⑧)

In the meantime, the module requesting module 12 has been waiting for the coming of the requested function executing module 9 since the module requesting module 12 requested the function executing module 9 from the module storing server 7. (S34)

After receiving the requested function executing module 9 (arrow ⑧), the module requesting module 12 sends it to the module executing module 13. (arrow ⑨) The module executing module 13 actuates a different thread shown in FIG. 4 in order to execute the requested function executing module 9 (S35). Then, the process-flow control goes back to the contents-request receiving module 10 to wait for another contents-request for repeating the above processes again. Instead of actuating the different thread for executing the requested function executing module 9, it is also acceptable to execute the requested function executing module 9 in a new process or in the present process.

In the different thread, the requested function executing module 9 is started (arrow ⑩) and it is waited until the requested function executing module 9 has been finished. (S41)

Then, the function executing module 9 performs a process of sending the contents to the client 5, which is the completion of the process. (arrow ⑪)

In the different thread, when the function executing module 9 has been finished, the module 9 is deleted from the server 6. (S42)

The above is the way the printing status or print waiting status of the printer 20 is sent to the client 5.

As stated above, the followings are features of the present embodiment system: The client 5, the server 6 and the module storing server 7 are linked to the network 8. The server 6 acquires one of the function executing modules $9_0 \ldots 9_N$ for performing a process corresponding to a request coming from the client 5, out of the module storing server 7, executes the acquired function executing module 9 and deletes the function executing module 9 from the server 6 when the function executing module 9 has been finished.

According to the above system, it is possible to supply various services by using a memory of small amount, because the server 6 acquires one of the function executing modules $9_0 \ldots 9_N$ for performing a process corresponding to each contents-request relating to the device 200 from the client 5, out of the module storing server 7.

The function executing modules $9_0 \ldots 9_N$ are stored in the module storing server 7 in Embodiment 1. It is also acceptable, as shown in FIG. 6, to provide the function executing modules $9_0 \ldots 9_N$ in the client 5.

Figure 6:
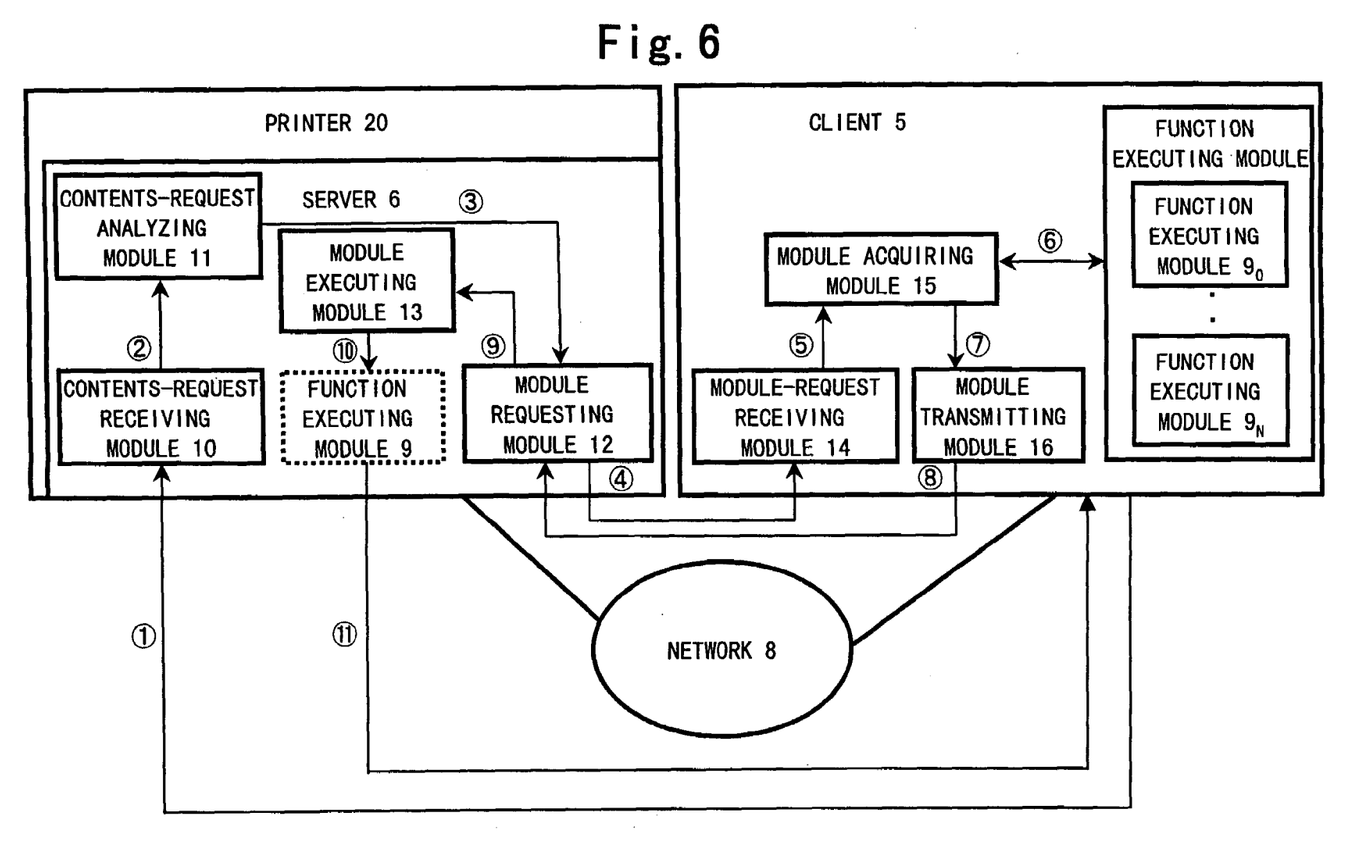
FIG. 6 shows another system configuration of the present invention.

In the system of FIG. 6, the client 5 and the server 6 are linked to the network 8. When a request comes from the client 5, the server 6 acquires one of the function executing modules $9_0 \ldots 9_N$ to perform a process corresponding to the request, executes the acquired function executing module 9 and deletes the module 9 from the server 6 when the module 9 has been finished.

Embodiment 2

Figure 7:
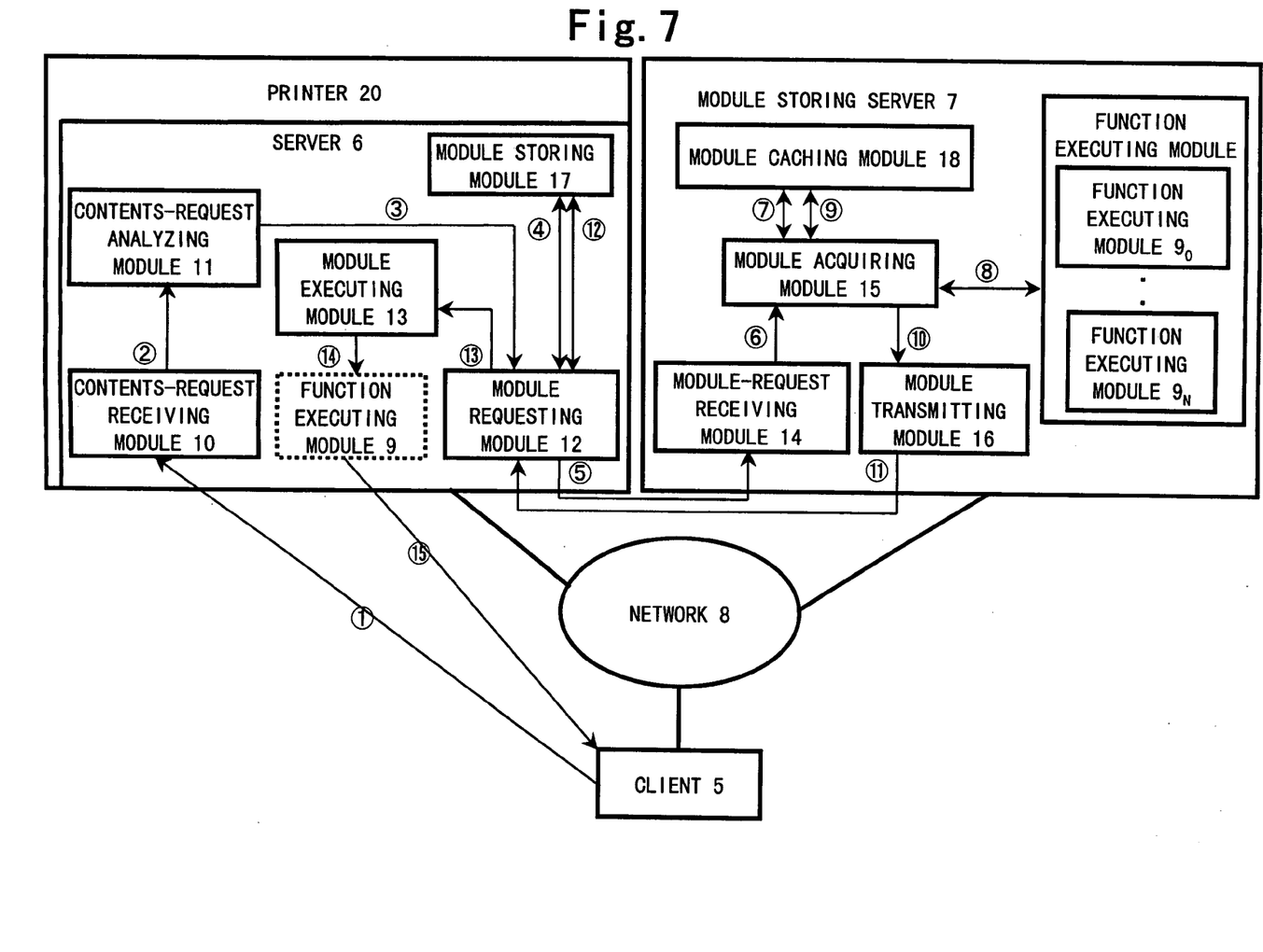
FIG. 7 shows a concrete system configuration of Embodiment 2 of the present invention.

FIG. 7 shows a concrete system according to Embodiment 2. The elements 5 through 16 and 20 in FIG. 7 are the same as those in Embodiment 1. A module storing module 17 stores acquired function executing modules 9 from the module storing server 7 as many as possible in the resource of the server 6. A module caching module 18 caches the requested function executing module 9 after sending the requested function executing module 9 to the server 6 based on the module request.

Detailed explanation for the processes of the client 5, the server 6 and the module storing server 7 will be described with reference to the flowcharts of FIGS. 8, 9 and 10, and the arrows between modules in FIG. 7.

Figure 8:
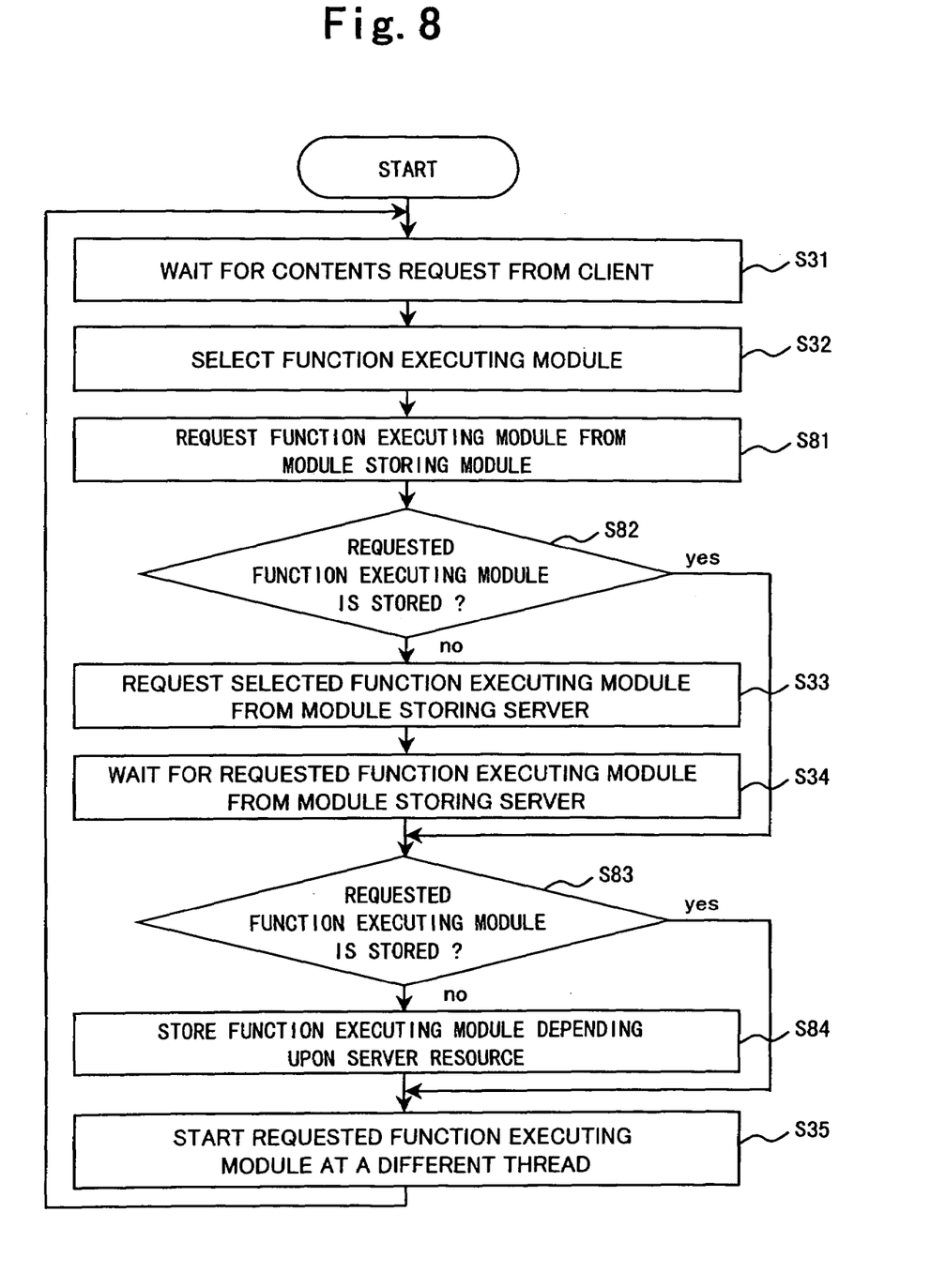
FIG. 8 is a flowchart showing processes performed in the server.
Figure 9:
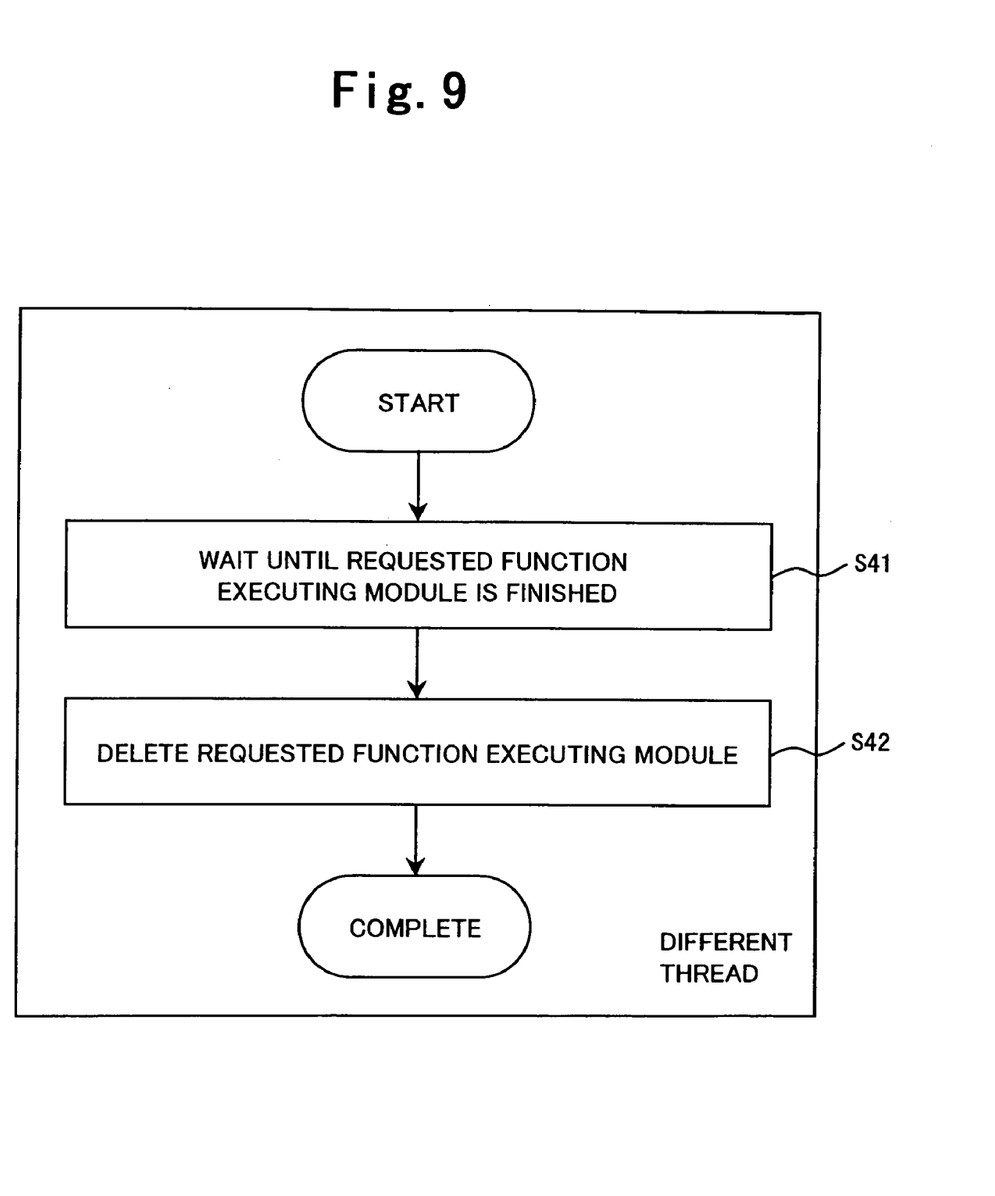
FIG. 9 is a flowchart showing processes performed in the server.
Figure 10:
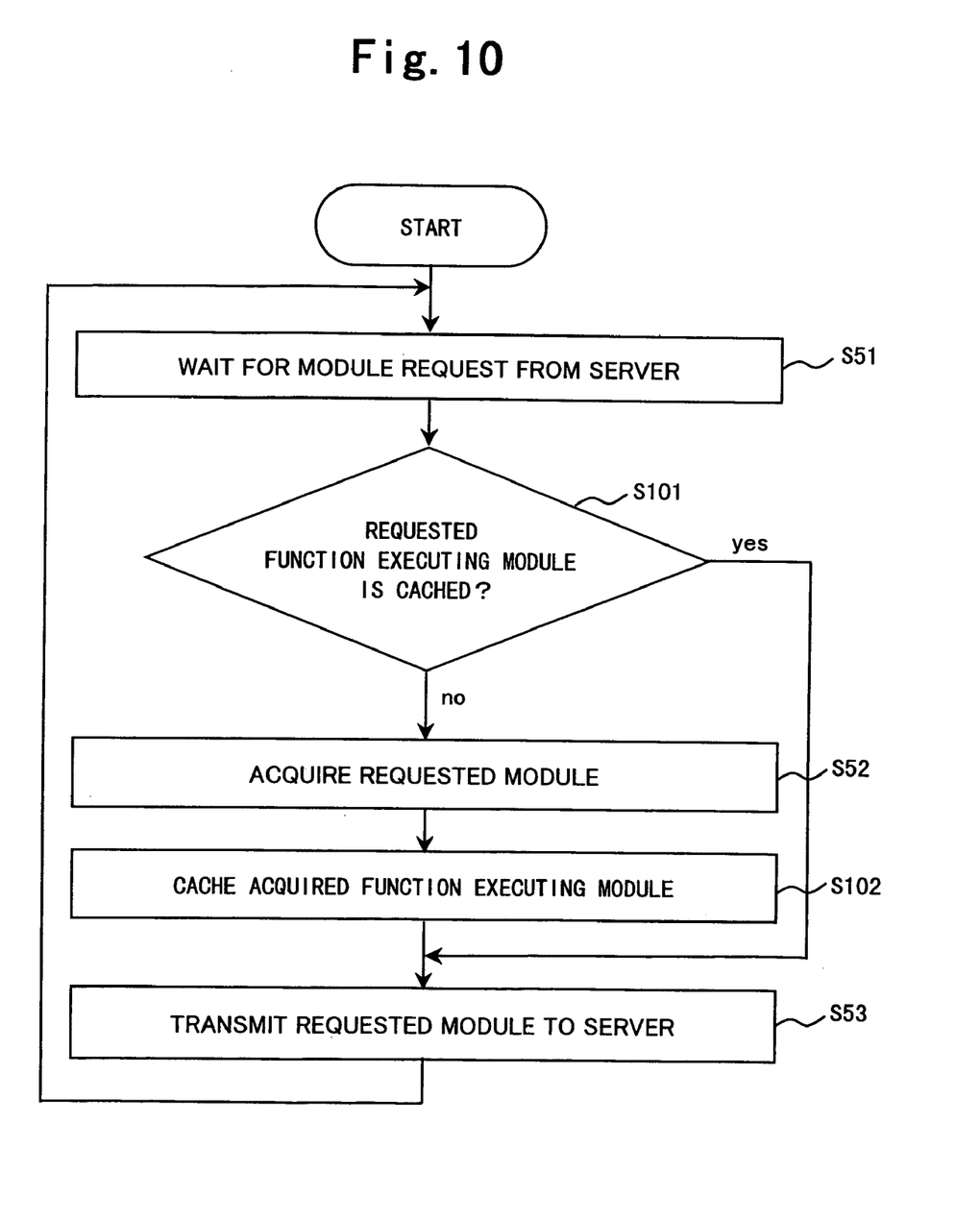
FIG. 10 is a flowchart showing processes performed in the module storing server.

FIGS. 8 and 9 show the processes performed at the server 6 and FIG. 10 shows those at the module storing server 7.

First, the contents-request receiving module 10 in the server 6 is waiting for a contents-request from the client 5. (S31) The client 5 requests contents from the sever 6. (arrow ①)

Then, the contents-request receiving module 10 receives the contents-request from the client 5 and sends the contents-request to the contents-request analyzing module 11. (arrow ②)

The contents-request analyzing module 11 analyzes the received contents-request in order to select one of the function executing modules $9_0 \ldots 9_N$ which has a necessary function for sending contents to the client 5, and informs the module requesting module 12 of the selected function executing module 9. (S32) (arrow ③)

The module requesting module 12 checks the module storing module 17 to find the selected function executing module 9 is stored or not. (S81) (arrow ④)

If the selected function executing module 9 is stored, the module storing module 17 transmits the selected function executing module 9 to the module requesting module 12. If not stored, the module storing module 17 informs the module requesting module 12 that the selected function executing module 9 is not stored. (arrow ④)

In the case of the selected function executing module 9 being transmitted from the module storing module 17, the module requesting module 12 transmits it to the module executing module 13. If it is informed that the selected function executing module 9 is not stored in the module storing module 17, the module requesting module 12 requests the selected function executing module from module storing server 7. (S33)

In the meantime, the module-request receiving module 14 in the module storing server 7 is waiting for the module request from the server 6. (S51)

After receiving the module request from the server 6 (arrow ⑤), the module-request receiving module 14 sends the module request to the module acquiring module 15. (arrow ⑥)

Then, receiving the module request, the module acquiring module 15 checks the module caching module 18 to find whether the requested function executing module 9 is cached or not. (S101) (arrow ⑦)

If the requested function executing module 9 is cached, the module caching module 18 sends it to the module acquiring module 15. If not cached, the module caching module 18 informs the module acquiring module 15 that the requested function executing module 9 is not cached. (arrow ⑦)

In the case of the selected function executing module 9 being transmitted from the module caching module 18, the module acquiring module 15 transmits it to the module transmitting module 16. (arrow ⑩) If it is informed that the requested function executing module 9 is not cached, the module acquiring module 15 acquires the requested function executing module 9 (S52) (arrow ⑧), transmits it to the module caching module 18 and module transmitting module 16. (arrows ⑨ and ⑩) Then, the module caching module 18 caches the transmitted function executing module 9. (S102)

The module transmitting module 16 transmits the received function executing module 9 to the sever 6. (S53) (arrow ⑪)

In the case that the module requesting module 12 requested the function executing module 9 from the module storing server 7, the coming of the requested function executing module 9 has been waited by the module requesting module 12. (S34)

After receiving the requested function executing module 9 (arrow ⑪), the module requesting module 12 sends it to the module executing module 13. (arrow ③) In the case of the requested function executing module 9 being sent from the module storing server 7, the module requesting module 12 also sends the module 9 to the module storing module 17. Then, the module storing module 17 stores the sent function executing module 9 if there is space for it in the resource of the server 6. If there is no enough space, the oldest function executing module 9 in the resource is deleted for making space to store the just sent function executing module 9. Consequently, the just sent function executing module 9 is stored. (S84) (arrow ⑫) FIFO (First In First Out) is used as the storing algorithm in the above, and it is also acceptable to apply other algorithms.

The module executing module 13 actuates a different thread in order to execute the requested function executing module 9. (S35) Then, the process-flow control goes back to the contents-request receiving module 10 to wait for another contents-request for repeating the above processes again. Instead of actuating the different thread for executing the requested function executing module 9, it is also acceptable to execute the requested function executing module 9 in a new process or in the present process.

In the different thread, the requested function executing module 9 is started (arrow ⑭) and it is waited until the requested function executing module 9 has been finished. (S41)

Then, the function executing module 9 performs a process of sending the contents to the client 5, which is the completion of the process. (arrow ⑮)

In the different thread, when the function executing module 9 has been finished, the module 9 is deleted from the server 6. (S42)

As stated above, the followings are features of the present embodiment system: After the module execution has been finished, the executed module is stored as long as there is space for storing it in the resource of the server 6, for the purpose of using the same module again.

As the module storing server 7 caches modules acquired by the server 6, in the case of using the same module again, one of the cached modules can be picked up from the cache and can be sent to the server 6.

According to the above system, the following advantages are achieved: It is possible to supply various services by using a memory of small amount, because the server 6 acquires one of the function executing modules $9_0 \ldots 9_N$ for performing a process corresponding to each contents-request from the client 5, out of the module storing server 7. Moreover, as the function executing modules are stored in the server or cached in the module storing server, the speed of responding to the client is increased and data transmitted to the network or data used for linking the sever and the module storing server is decreased.

The function executing modules $9_0 \ldots 9_N$ are stored in the module storing server 7 in Embodiment 2. It is also acceptable, as shown in FIG. 11, to provide the function executing modules $9_0 \ldots 9_N$ in the client 5.

Figure 11:
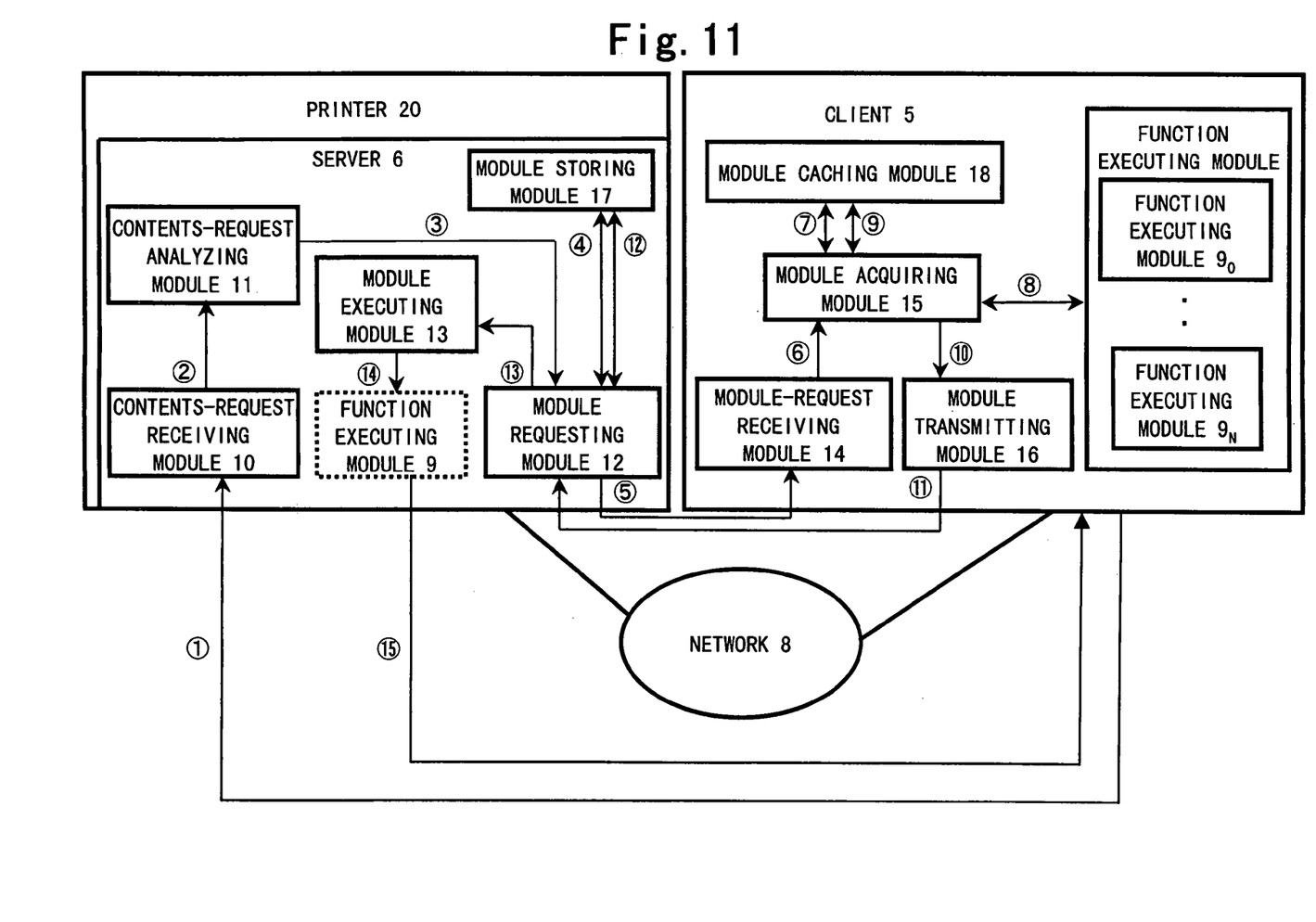
FIG. 11 shows another system configuration of the present invention.

In the system shown in FIG. 11, when the module execution has been finished, the executed module is stored as long as there is space for storing it in the resource of the server 6, for the purpose of using the same module again.

As the client 5 caches modules acquired by the server 6, in the case of using the same module again, one of the cached modules can be picked up from the cache and can be sent to the server 6.

The modules described in the above Embodiments can be hardware, software, firmware or combination of them.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A system of dynamic module configuration which is linked through a network comprising:

a memory, linked to the network, for storing a plurality of function executing modules which execute specific processes;

a request device, located on said network remotely from said memory, which outputs an execution request for executing one of the specific processes; and an execution device, integrated within one of a plurality of different device apparatuses which are located on said network remotely from said memory and said request device, for receiving, through the network, the execution request output from the request device, acquiring, through the network, one of the plurality of function executing modules which has a function of realizing the execution request from the memory, executing the acquired function executing module and providing a result of execution of the acquired function executing module to the request device, wherein each execution request has one corresponding function executing module stored in the memory that relates to the execution request for the device apparatus, the function executing module being installed in the execution device upon acquiring from the memory and uninstalled from the execution device upon finishing execution of the function executing module, wherein the request device is a client which outputs a contents request corresponding to the execution request, the execution device is a server which receives the contents request and responds to the contents request, and the memory is a module storing server which stores the plurality of function executing modules for responding to the contents request, wherein the server includes a contents-request receiving module for receiving the contents request from the client, a contents-request analyzing module for analyzing the contents request received by the contents-request receiving module in order to select one of the plurality of function executing modules which has a function needed in responding to the contents request, a module request module for requesting a selected function executing module from the module storing server based on an analyzing result by the contents-request analyzing module, and for receiving the selected function executing module from the module storing server, and a module executing module for executing the selected function executing module received by the module requesting module.

2. The system of dynamic module configuration of claim 1, wherein the execution device deletes the acquired function executing module after the acquired function executing module has been executed.

3. The system of dynamic module configuration of claim 1, wherein the execution device stores the acquired function executing module after the acquired function executing module has been executed, and re-executes the acquired function executing module stored in the execution device when it is requested to execute a module having a function corresponding to the acquired function executing module.

4. The system of dynamic module configuration of claim 1, wherein the memory caches the function executing module acquired by the execution device and provides the function executing module cached in the memory when it is requested to acquire a module, which has a function corresponding to the function executing module cached in the memory, by the execution module.

5. The system of dynamic module configuration of claim 1, wherein the request device and the memory are installed in a device.

6. The system of dynamic module configuration of claim 1, wherein the module storing server includes a module-request receiving module for receiving a module request from the module requesting module, a module acquiring module for acquiring a function executing module out of the plurality of the plurality of function executing modules based module request received by the module request receiving module, and a module transmitting module for transmitting the function executing module acquired by the module acquiring module to the server.

7. The system of dynamic module configuration of claim 6, wherein the module storing server further includes a module caching module for caching the selected function executing module after the selected function executing module has been sent to the server.

8. The system of dynamic module configuration of claim 1, wherein the server further includes a module storing module for storing the selected function executing module acquired from the module storing server as many as possible in a resource of the server.

9. A dynamic module configuration method using a network comprising the steps of:

storing in a memory a plurality of function executing modules for executing specific processes;

outputting, by a request device through the network, an execution request for executing one of the specific processes; and receiving, by an execution device integrated within one of a plurality of different device apparatuses, located on said network remotely from said memory and said request device, the execution request through the network, acquiring, through the network, one of the plurality of function executing modules from the memory which has a function of realizing the execution request, executing the acquired function executing module and providing a result of execution of the acquired function executing module to the request device, wherein each execution request has one corresponding function executing module stored in the memory that relates to the execution request for the device apparatus, the function executing module being installed in the execution device upon acquiring from the memory and uninstalled from the execution device upon finishing execution of the function executing module, wherein the request device is a client which outputs a contents request corresponding to the execution request, the execution device is a server which receives the contents request and responds to the contents request, and the memory is a module storing server which stores the plurality of function executing modules for responding to the contents request, wherein the server includes a contents-request receiving module for receiving the contents request from the client, a contents-request analyzing module for analyzing the contents request received by the contents-request receiving module in order to select one of the plurality of function executing modules which has a function needed in responding to the contents request, a module request module for requesting a selected function executing module from the module storing server based on an analyzing result by the contents-request analyzing module, and for receiving the selected function executing module from the module storing server, and a module executing module for executing the selected function executing module received by the module requesting module.

10. The dynamic module configuration method of claim 9, wherein the step of executing the acquired function executing module includes the step of deleting the acquired function executing module after the acquired function executing module has been executed.

11. The dynamic module configuration method of claim 9, wherein the step of executing the acquired function executing module includes the step of storing the acquired function executing module after the acquired function execution executing module has been executed, and re-executing the acquired function executing module when it is requested to execute a module having a function corresponding to the acquired function executing module.

12. The dynamic module configuration method of claim 9, wherein the step of memorizing the plurality of function executing modules includes the step of caching the acquired function executing module, and providing the acquired function executing module cached at the caching step when it is requested to acquire a module having a function corresponding to the acquired function executing module.

13. A system of dynamic module configuration comprising:

an internal resource of a device for performing an original function of the device; and an execution device, integrated within the device, for receiving an execution request, through a network from a request device, which requests a performance of a function of the device, acquiring, from an external resource, one of a plurality of function executing modules which has a function of realizing the execution request, and executing the acquired function executing module, wherein the receiving, acquiring and executing are performed by using a part of the internal resource and wherein an executed result is obtained from executing the acquired function executing module and the executed result is provided to the device, wherein each execution request has one corresponding function executing module stored in a memory that relates to the execution request for the device, the function executing module being installed in the execution device upon acquiring from the memory and uninstalled from the execution device upon finishing execution of the function executing module; and wherein the external resource is located remotely on said network from said execution device, wherein the request device is a client which outputs a contents request corresponding to the execution request, the execution device is a server which receives the contents request and responds to the contents request, and the memory is a module storing server which stores the plurality of function executing modules for responding to the contents request, wherein the server includes
  a contents-request receiving module for receiving the contents request from the client,
  a contents-request analyzing module for analyzing the contents request received by the contents-request receiving module in order to select one of the plurality of function executing modules which has a function needed in responding to the contents request,
  a module request module for requesting a selected function executing module from the module storing server based on an analyzing result by the contents-request analyzing module, and for receiving the selected function executing module from the module storing server, and
  a module executing module for executing the selected function executing module received by the module requesting module.

14. The system of dynamic module configuration of claim 13, wherein the internal resource includes a central processing unit and a memory, the execution device includes a program stored in the memory and executed by the central processing unit, and the external resource includes a memory, being independent of the device, for memorizing the plurality of function executing modules.

15. A method of providing execution module instructions to plural operational devices on a network, comprising the steps of:

storing plural diverse execution modules in a memory located remotely on said network from said operational devices, each of said plural diverse execution modules containing a set of instructions uniquely usable by an operational device;

requesting an action by a request device to be performed by a selected operational device which is achieved through a set of instructions contained in a requested execution module;

acquiring said requested execution module by an execution device integrated within said selected operational device from said remote memory, said selected operational device executing said set of instructions contained in said requested execution module to perform the requested action;

wherein each requested action has one corresponding execution module related to the requested action for said selected operational device, the execution module being installed in the execution device of said selected operational device upon being acquired and uninstalled from the execution device upon finishing execution of the set of instructions contained in the requested execution module; and wherein the request device is remotely located on the network from said plural operational devices and said memory, wherein the request device is a client which outputs a contents request corresponding to the requested action, the execution device is a server which receives the contents request and responds to the contents request, and the memory is a module storing server which stores said plural diverse execution modules for responding to the contents request, wherein the server includes
  a contents-request receiving module for receiving the contents request from the client,
  a contents-request analyzing module for analyzing the contents request received by the contents-request receiving module in order to select one of said plural diverse execution modules which has a function needed in responding to the contents request,
  a module request module for requesting a selected diverse execution module from the module storing server based on an analyzing result by the contents-request analyzing module, and for receiving the selected diverse execution module from the module storing server, and
  a module executing module for executing the selected diverse execution module received by the module requesting module.

16. The method of claim 15, wherein the operational device includes an execution device for executing the requested execution module acquired from said memory.

* * * * *